(12) United States Patent
Nakagawa et al.

(10) Patent No.: US 12,037,075 B2
(45) Date of Patent: Jul. 16, 2024

(54) SHOCK ABSORBER

(71) Applicant: Hitachi Astemo, Ltd., Hitachinaka (JP)

(72) Inventors: Takashi Nakagawa, Hitachinaka (JP); Shumpei Tada, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 400 days.

(21) Appl. No.: 17/411,804

(22) Filed: Aug. 25, 2021

(65) Prior Publication Data

US 2021/0380194 A1 Dec. 9, 2021

Related U.S. Application Data

(63) Continuation of application No. PCT/JP2019/014816, filed on Apr. 3, 2019.

(51) Int. Cl.
*B62K 25/08* (2006.01)
*F16F 9/34* (2006.01)
*F16F 13/00* (2006.01)
*B62K 25/10* (2006.01)

(52) U.S. Cl.
CPC ............ *B62K 25/08* (2013.01); *F16F 13/007* (2013.01); *B62K 25/10* (2013.01); *F16F 2222/12* (2013.01); *F16F 2230/30* (2013.01); *F16F 2230/42* (2013.01); *F16F 2232/08* (2013.01); *F16F 2234/02* (2013.01)

(58) Field of Classification Search
CPC ....... B62K 25/08; B62K 25/10; F16F 9/0209; F16F 9/34; F16F 9/36; F16F 13/007; F16F 2222/12; F16F 2230/30; F16F 2230/42; F16F 2232/08; F16F 2234/02
See application file for complete search history.

(56) References Cited

U.S. PATENT DOCUMENTS 6,547,046 B2 * 4/2003 Yamaguchi ............. F16F 9/363
188/322.18
6,971,493 B2 * 12/2005 Yoshimoto ............. B62K 25/08
188/315

(Continued)

FOREIGN PATENT DOCUMENTS

JP 2003247585 A 9/2003
JP 2004-044643 A 2/2004

(Continued)

OTHER PUBLICATIONS

Indian Office Action mailed Mar. 11, 2022 for the corresponding Indian Patent Application No. 202147038436 (6 pages).

(Continued)

*Primary Examiner* — Thomas W Irvin
(74) *Attorney, Agent, or Firm* — Leason Ellis LLP; Edward J. Ellis; Melvin C. Garner

(57) ABSTRACT

A shock absorber includes a holding member that holds a rod. Inside the holding member, there is formed a flow path through which oil passes. The flow path include a first flow path extending along an axis of the rod from one end of the holding member in an axial direction, a second flow path extending from one end portion of the first flow path along a radial direction of the rod, and a third flow path extending along the axis of the rod from one end portion of the second flow path to the other end of the holding member in the axial direction.

6 Claims, 7 Drawing Sheets

(56) References Cited

U.S. PATENT DOCUMENTS

| | | | | |
|---|---|---|---|---|
| 7,575,110 B2* | 8/2009 | Yoshimoto | ............. | B62K 25/08 |
| | | | | 267/221 |
| 8,251,355 B2* | 8/2012 | Tomiuga | ................... | F16F 9/18 |
| | | | | 188/315 |
| 10,076,941 B2* | 9/2018 | Konakai | ............... | F16F 9/3242 |
| 10,458,507 B2* | 10/2019 | Tomiuga | ................ | F16F 9/362 |
| 10,780,932 B2* | 9/2020 | Shirai | ........................ | B62J 1/08 |
| 11,400,999 B2* | 8/2022 | Ishihara | ................ | B62K 25/08 |
| 2001/0023638 A1* | 9/2001 | Yamaguchi | ............. | F16F 9/363 |
| | | | | 92/165 R |
| 2007/0102252 A1* | 5/2007 | Yoshimoto | ................ | F16F 9/34 |
| | | | | 267/221 |
| 2009/0261555 A1* | 10/2009 | Tomiuga | ................... | F16F 9/20 |
| | | | | 280/279 |
| 2014/0202809 A1* | 7/2014 | Ozaki | ..................... | F16J 15/56 |
| | | | | 277/562 |
| 2015/0096852 A1 | 4/2015 | Yoshida | | |
| 2016/0025237 A1 | 1/2016 | Mori et al. | | |
| 2016/0101662 A1* | 4/2016 | Konakai | ............... | F16F 9/3242 |
| | | | | 188/315 |
| 2018/0112735 A1 | 4/2018 | Tomiuga | | |
| 2018/0244330 A1* | 8/2018 | Shirai | ........................ | B62J 1/08 |
| 2020/0148301 A1* | 5/2020 | Ishihara | ................ | B62K 25/08 |
| 2022/0204117 A1* | 6/2022 | Aoki | ..................... | B62K 21/14 |
| 2022/0341481 A1* | 10/2022 | Roessle | ..................... | F16F 9/34 |
| 2023/0375065 A1* | 11/2023 | Kobayashi | ................ | F16F 9/36 |

FOREIGN PATENT DOCUMENTS

| | | |
|---|---|---|
| JP | 2004-044669 A | 2/2004 |
| JP | 2004-052879 A | 2/2004 |
| JP | 2009-108884 A | 5/2009 |
| JP | 2009-108937 A | 5/2009 |
| JP | 2012-077886 A | 4/2012 |
| JP | 2015-075133 A | 4/2015 |
| JP | 5952762 B2 | 7/2016 |
| JP | 2016-194355 A | 11/2016 |

OTHER PUBLICATIONS

International Search Report mailed May 7, 2019 for the corresponding PCT International Application No. PCT/JP2019/014816.
International Written Opinion mailed May 7, 2019 for the corresponding PCT International Application No. PCT/JP2019/014816.

* cited by examiner

SHOCK ABSORBER

CROSS-REFERENCE TO RELATED APPLICATION(S)

This application is a Continuation of International Application No. PCT/JP2019/014816, which was filed on Apr. 3, 2019, the content of which is incorporated herein by reference in its entirety.

FIELD OF THE INVENTION

The present invention relates to a shock absorber provided with a holding member for holding a rod.

BACKGROUND OF THE INVENTION

For example, a front wheel of a motorcycle is supported by a vehicle body via a shock absorber referred to as a front fork. Such a shock absorber is provided with a rod inside a double tube provided to be relatively movable, and the rod is provided with a piston for generating a damping force. Further, some shock absorbers include a holding member that holds the outer periphery of the rod. As a related art relating to a shock absorber provided with a holding member, there is a technique disclosed in Patent Literature 1.

In a hydraulic shock absorber as disclosed in Patent Literature 1, a partition wall member is provided on an inner periphery of an inner tube, a portion below the partition wall member is defined as a working oil chamber, and a portion above the partition wall member is defined an oil reservoir chamber. Further, a piston rod attached to an outer tube side is inserted into the working oil chamber through the partition wall member, and a piston sliding in the working oil chamber is provided at a tip end portion of the piston rod. Further, an oil hole communicating a piston side oil chamber with an annular oil chamber is provided in the partition wall member.

Since the piston side oil chamber and the oil reservoir chamber are communicated with each other, an oil pressure of the piston side oil chamber and an oil pressure of the oil reservoir chamber can be made the same. As a result, the piston can be operated smoothly, and a stable damping force can be generated.

Patent Literature 1: JP-A-2004-44669

Reduction in size is a general problem for the shock absorber. In this regard, when diameters of the inner tube and the outer tube are reduced in order to reduce the size while maintaining the structure of the hydraulic shock absorber disclosed in Patent Literature 1 as it is, a diameter of the partition wall member also becomes small. As a result, it is difficult to provide the partition wall member with an oil hole that communicates the piston side oil chamber and the oil reservoir chamber, and smooth operation of the piston may be hindered. If the smooth operation of the piston is hindered, it may be difficult to generate a damping force. Therefore, it is required to develop a new structure capable of reliably generating a damping force even when the size is reduced.

An object of the present invention is to provide a shock absorber capable of reliably generating a damping force even with a reduced size.

SUMMARY OF THE INVENTION

As a result of diligent studies, the present inventors have found that (1) by forming a flow path that combines a flow path extending along an axis of a rod and a flow path extending in a radial direction of the rod inside a holding member that holds the rod, a piston can be smoothly operated even with a reduced size, and (2) by arranging a ring-shaped member inside the holding member, the flow path can be easily formed. The present invention was completed based on the finding.

Hereinafter, the present invention will be described. In the following description, for ease of understanding of the present invention, reference numerals in the accompanying drawings are appended in parentheses, but the present invention is not limited to the illustrated embodiments.

According to an aspect of the present invention, there is provided a shock absorber including:

an outer tube (12) having a tubular shape;

a tubular inner tube (13) provided inside the outer tube (12), provided to be movable relative to the outer tube (12), and filled with oil (Oi) therein;

a rod-shaped rod (14) provided inside the inner tube (13), supported by the outer tube (12) or the inner tube (13), and extending along an axial direction of the inner tube (13);

a piston (15) fixed to the rod (14) and configured to generate a damping force when the inner tube (13) moves relative to the outer tube (12);

an urging member (16) configured to urge the outer tube (12) and the inner tube (13) in directions away from each other;

a holding member (20; 20B) provided on an outer periphery of the rod (14), whose inner periphery is in contact with the rod (14) and outer periphery is in contact with the inner tube (13) so as to hold the rod (14); and a flow path (R) formed inside the holding member (20; 20B) and through which the oil (Oi) passes, the flow path including a first flow path (R1) extending along the rod (14) from one end of the holding member (20; 20B) in the axial direction, a second flow path (R2) extending from an end portion of the first flow path (R1) along a radial direction of the rod (14), and a third flow path (R3) extending along the rod (14) from an end portion of the second flow path (R2) to the other end of the holding member (20; 20B) in the axial direction.

Further, an annular ring-shaped member (25; 65) may be disposed between the first flow path (R1) and the third flow path (R3), the ring-shaped member (25; 65) may be provided with a recessed portion (25a; 65a) recessed from an outer edge toward the rod so as to connect the first flow path (R1) to the third flow path (R3), and the second flow path (R2) may be formed by the recessed portion (25a; 65a).

Further, the holding member (20) may include:

a first member (40) having a tubular first main body portion (41) provided on an inner side of the inner tube (13) and extending in the axial direction of the inner tube; and a second member (50) having a tubular second main body portion (51) provided on an inner side of the first member (40) and an outer side of the rod (14) and extending in the axial direction of the inner tube, and a second protruding portion (52) protruding from the second main body portion (51) toward the first main body portion (41), and the first flow path (R1) may include a space formed between the first main body portion (41) and the second protruding portion (52).

Further, the first member (40) may have a first protruding portion (42) protruding from the first main body portion (41) toward the second main body portion (51), and the third flow path (R3) may include a space formed between the first protruding portion (42) and the second main body portion (51).

Further, the recessed portion (25a) may be a slit provided in the ring-shaped member (25).

Further, the recessed portion (25a) may include a plurality of recessed portions having a slit shape.

Further, the holding member (20B) may include a second member (50B) having a tubular second main body portion (51) provided on an outer side of the rod (14) and a second protruding portion (52B) protruding outward in the radial direction of the rod from the second main body portion (51), and the second flow path (R2) may be formed by a groove portion (52Bc) having a recessed shape from an outer edge of the second protruding portion (52B) toward the rod (14).

According to another aspect of the present invention, there is provided a shock absorber including:

a tubular outer tube (12) disposed at an upper part;

a tubular inner tube (13) extending downward from inside of the outer tube (12), provided to be movable relative to the outer tube (12), and filled with oil (Oi) therein;

a rod (14) provided inside the inner tube (13) and supported by the outer tube (12) or the inner tube (13);

a piston (15) fixed to the rod (14) and configured to generate a damping force when the inner tube (13) moves relative to the outer tube (12);

an urging member (16) configured to urge the outer tube (12) and the inner tube (13) in directions away from each other; and a holding member (20) provided on an outer periphery of the rod (14), whose inner periphery is in contact with the rod (14) so as to hold the rod (14), in which the holding member (20) includes:

a first member (40) having a tubular first main body portion (41) provided along an inner periphery of the inner tube (13) and a first protruding portion (42) protruding from the first main body portion (41) toward the rod (14);

a second member (50) having a tubular second main body portion (51) provided on an inner side of the first member (40) and an outer side of the rod (14), and a second protruding portion (52) provided below the first protruding portion (42) and protruding from the second main body portion (51) toward the first main body portion (41), the second protruding portion (52) being urged toward the first protruding portion (42);

a ring-shaped member (25; 65), which is an annular member sandwiched by the first protruding portion (42) and the second protruding portion (52), having a plurality of recessed portions (25a, 65a) that are recessed from an outer edge further to the rod (14) side than a tip end of the first protruding portion (42); and a flow path including a first flow path (R1) which is a space between the first main body portion (41) and the second protruding portion (52) and through which the oil (Oi) passes, a second flow path (R2) which is a space defined by the recessed portions (25a; 65a) and through which the oil (Oi) passes, and a third flow path (R3) which is a space between the first protruding portion (42) and the second main body portion (51) and through which the oil (Oi) passes.

According to an aspect of the present invention, it is possible to provide a shock absorber capable of reliably generating a damping force even with a reduced size.

DETAILED DESCRIPTION OF THE INVENTION

Figure 1:
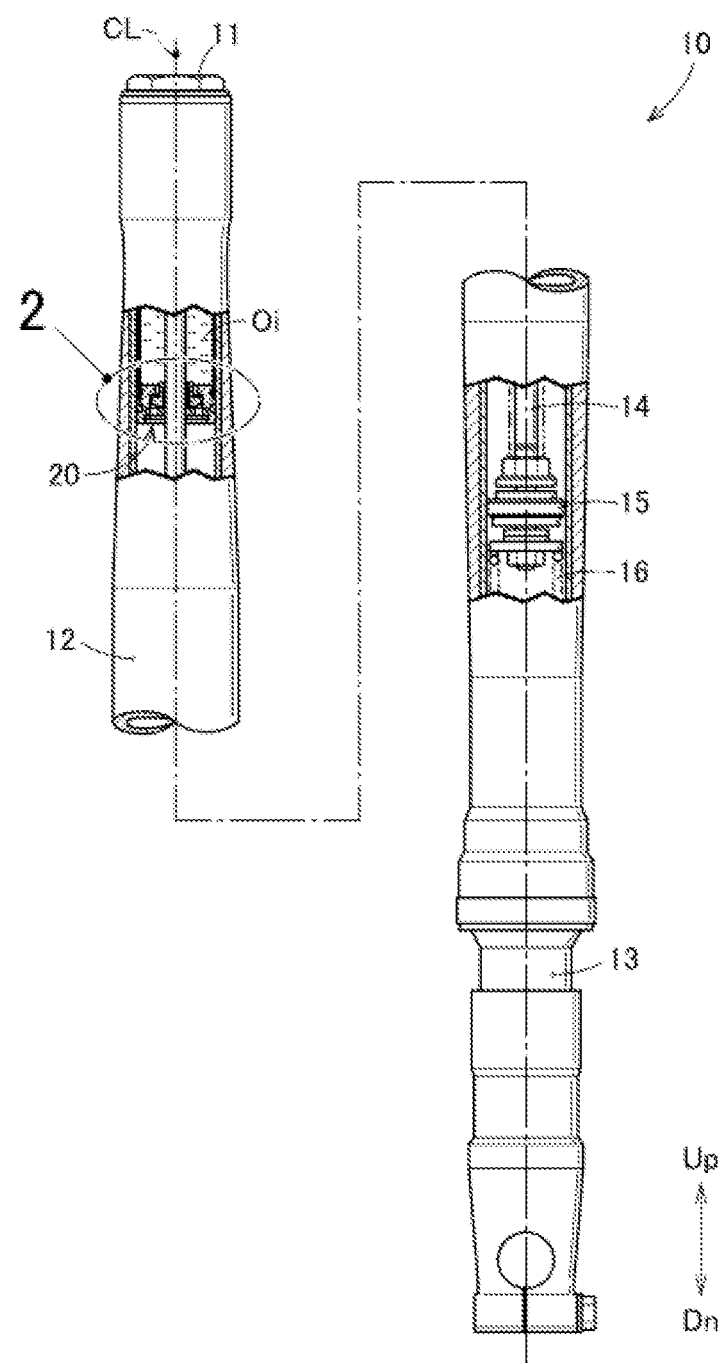
FIG. 1 is a front view of a shock absorber according to a first embodiment.

Embodiments of the present invention will be described below with reference to the accompanying drawings. In the description, left and right refer to left and right with respect to an occupant of a vehicle, and front and rear refer to front and rear with respect to a traveling direction of the vehicle. In the drawings, Fr indicates a front direction, Rr indicates a rear direction, Le indicates a left direction when viewed from the occupant, Ri indicates a right direction when viewed from the occupant, Up indicates an upper direction, and Dn indicates a lower direction. The embodiments shown in the accompanying drawings are examples of the present invention, and the present invention is not limited to the embodiments.

First Embodiment

Reference is made to FIG. 1. FIG. 1 shows a shock absorber 10 according to the present invention. The shock absorber 10 is, for example, an inverted front fork that supports a front wheel of a two-wheeled vehicle.

The shock absorber 10 includes an outer tube 12 which is disposed at an upper portion and whose upper end is closed by the lid body 11, an inner tube 13 which extends downward from the inside of the outer tube 12 and is provided to be movable relative to the outer tube 12, a rod 14 which is provided inside the inner tube 13 and is supported by the outer tube 12, a piston 15 which is fixed to the rod 14 and is capable of generating a damping force, an urging member 16 which urges the outer tube 12 upward via the piston 15, and a holding member 20 which is provided on an outer periphery of the rod 14 and holds the rod 14.

The outer tube 12 is a tubular member whose upper portion is supported by a vehicle body. An axial center of the outer tube 12 coincides with an axis CL of the rod 14, and an axial direction of the outer tube 12 is parallel to the axis CL.

An upper portion of the inner tube 13 is provided inside the outer tube 12, and a lower portion of the inner tube 13 is exposed to the outside. The lower portion of the inner tube 13 is fixed to a shaft of the front wheel. The inner tube 13 is filled with oil Oi therein. An axial center of the inner tube 13 coincides with the axis line CL of the rod 14, and an axial direction of the inner tube 13 is parallel to the axis CL.

One end of the rod 14 is supported by the lid body 11, and the rod 14 can be displaced together with the outer tube 12. That is, the rod 14 is provided to be movable relative to the inner tube 13.

The piston 15 is movable along an inner peripheral surface of the inner tube 13 together with the rod 14. The oil Oi can pass through the inside of the piston 15, and when the piston 15 moves together with the rod 14, a damping force is generated. Here, the inner tube 13 is provided to be movable relative to the outer tube 12, the rod 14, and the piston 15. Therefore, it can be said that the piston 15 generates the damping force when the inner tube 13 moves with respect to the outer tube 12. The piston 15 generates a damping force at both the time of expansion and the time of compression.

The urging member 16 is implemented by a coil spring, one end of which is in contact with the inner tube 13 and the other end of which is in contact with the vicinity of the piston 15. The urging member 16 urges the outer tube 12 upward via the piston 15 and the rod 14. An urging force of the urging member 16 acts in a direction in which the outer tube 12 and the inner tube 13 are separated from each other.

Figure 2:
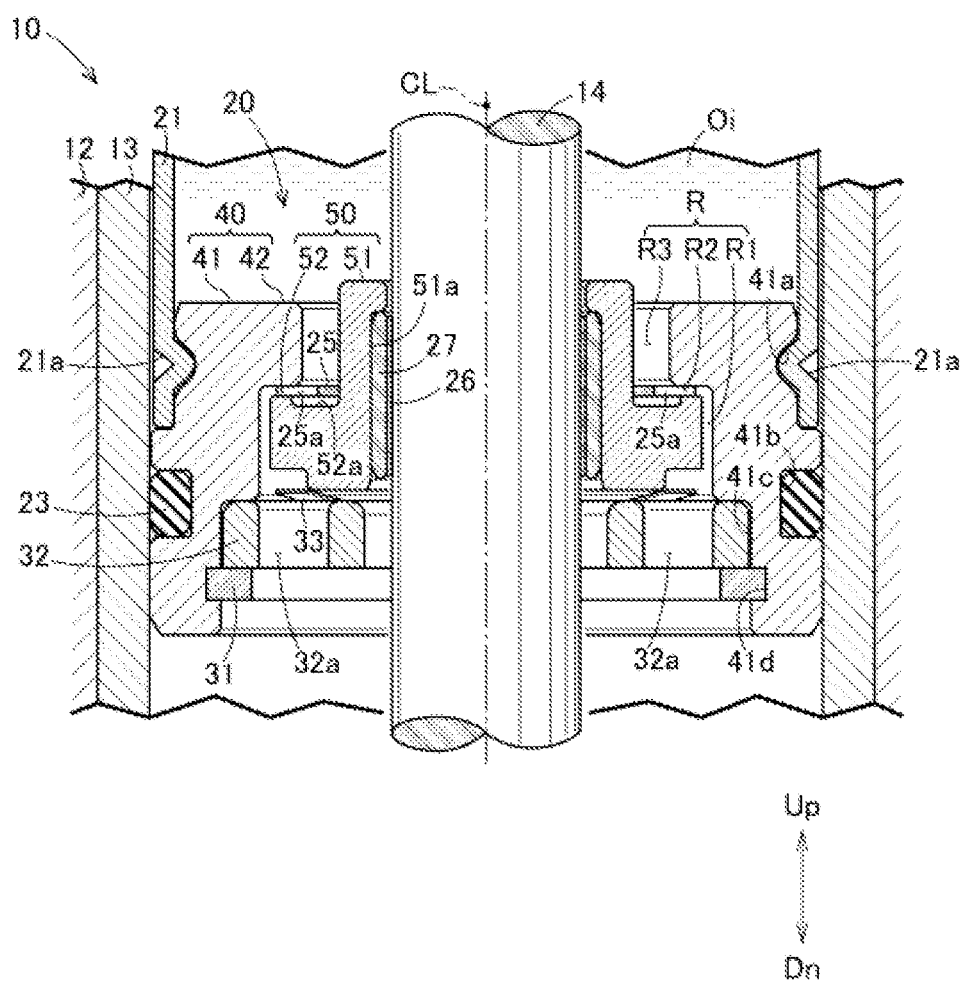
FIG. 2 is an enlarged view of a part 2 in FIG. 1.

Reference is made to FIG. 2. The holding member 20 holds the rod 14 with an inner periphery thereof in contact with the rod 14 and an outer periphery thereof in contact with the inner tube 13.

The holding member 20 includes a tubular support tube 21 supported by the lid body 11 (see FIG. 1), a first member 40 fixed to the support tube 21 and provided along an inner periphery of the inner tube 13, a seal 23 fitted to an outer periphery of the first member 40 and in contact with the inner periphery of the inner tube 13, a second member 50 provided along an inner side of the first member 40 and the rod 14, an annular ring-shaped member 25 sandwiched between the second member 50 and the first member 40, two collars 26 and 27 provided between the second member 50 and the rod 14, a retaining ring 31 having a C-shaped ring shape and fixed to an inner periphery of the first member 40, a receiving seat 32 whose removal is prevented by the retaining ring 31, and a second member urging portion 33 whose one end is in contact with the receiving seat 32 and the other end is in contact with the second member 50 such that the second member 50 is urged toward the ring-shaped member 25.

The support tube 21 is crimped at a plurality of positions. The support tube 21 is fastened to the first member 40 via a crimped and deformed crimped portion 21a.

The first member 40 includes a substantially tubular first main body portion 41 provided along the inner peripheral surface of the inner tube 13 and extending in the axial direction of the inner tube 13, and a first protruding portion 42 protruding from the first main body portion 41 toward the rod 14.

On an outer periphery on the outer periphery of the first main body portion 41, a crimping groove 41a into which a part of the crimped support tube 21 is engaged and a seal groove 41b into which the seal 23 is fitted are continuously formed in a peripheral direction. The support tube 21 is intermittently crimped toward the crimping groove 41a at a plurality of locations.

On an inner periphery of the first main body portion 41, a first housing recessed portion 41c whose diameter is increased to house the receiving seat 32 and a retaining ring groove 41d that is a part of the first housing recessed portion 41c and into which the retaining ring 31 is fitted are continuously formed in the peripheral direction.

The first protruding portion 42 is formed integrally with the first main body portion 41 at an upper end of the first main body portion 41. The first protruding portion 42 is continuously formed over the inner periphery of the first main body portion 41 in the peripheral direction, and protrudes from the first main body portion 41 toward the second member 50.

For example, an O-ring can be adopted for the seal 23.

The second member 50 includes a substantially tubular second main body portion 51 that is provided along an inner side of the first main body portion 41 and the outer side of the rod 14, and a second protruding portion 52 that protrudes outward from the second main body portion 51 toward the first main body portion 41 below the first protruding portion 42.

On an inner periphery of the second main body portion 51, a second housing recessed portion 51a, whose diameter is increased to house the collars 26 and 27, is continuously formed in the peripheral direction.

The second protruding portion 52 is urged toward the first protruding portion 42. A part of an upper surface of the second protruding portion 52 is formed by an annular groove 52a that is continuous in the peripheral direction. The ring-shaped member 25 is placed on an outer edge of the annular groove 52a.

The second protruding portion 52 protrudes toward the first main body portion 41. Above the second protruding portion 52, the first protruding portion 42 protrudes toward the second main body portion 51.

The ring-shaped member 25 is an annular ring-shaped member sandwiched between the first protruding portion 42 and the second protruding portion 52.

Figure 3:
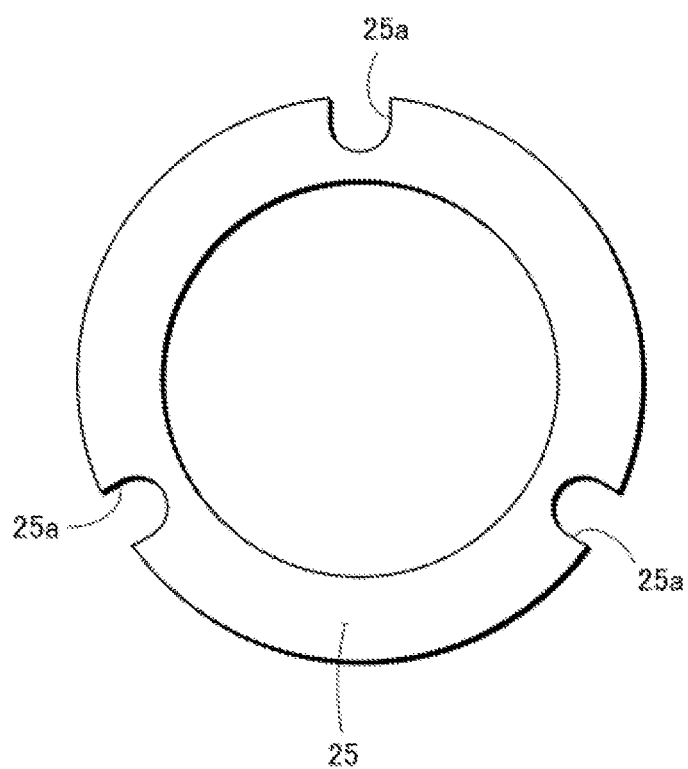
FIG. 3 is a plan view of a ring-shaped member shown in FIG. 2.

Reference is also made to FIG. 3. The ring-shaped member 25 has three (a plurality of) recessed portions 25a that are recessed from an outer edge further to the rod 14 side than a tip end of the first protruding portion 42. The recessed portions 25a are all formed in a slit shape and are separated by approximately 120° in the peripheral direction.

The recessed portion 25a can be formed by, for example, punching work together with a round hole formed in the center of the ring-shaped member 25. That is, the ring-shaped member 25 can be formed of a metal plate by one process.

Reference is made to FIG. 2. The receiving seat 32 is a substantially ring-shaped member, and formed with a plurality of oil passing holes 32a through which the oil Oi passes.

The second member urging portion 33 is a leaf spring.

A flow path R through which the oil Oi can pass is formed inside the holding member 20 described above. The flow path R includes a first flow path R1 which is a space formed between the first main body portion 41 and the second protruding portion 52, a second flow path R2 which is a space formed by the recessed portion 25a, and a third flow path R3 which is a space formed between the first protruding portion 42 and the second main body portion 51.

The first flow path R1 extends from one end of the holding member 20 along the axis CL of the rod 14, the second flow path R2 extends from an end portion of the first flow path R1 along a radial direction of the rod 14, and the third flow path R3 extends from one end portion of the second flow path R2 to the other end of the holding member 20 along the axis CL of the rod 14.

The third flow path R3 is located above the first flow path R1, and is located at a position closer to the axis CL of the rod 14 than the first flow path RE The third flow path R3 can also be referred to as a space formed between the first protruding portion 42 and the second main body portion 51.

The ring-shaped member 25 is disposed between the first flow path R1 and the third flow path R3. The recessed portion 25a is formed so as to connect the first flow path R1 to the third flow path R3.

Next, an operation of the shock absorber 10 will be described.

Reference is made to FIG. 1. When the front wheel rides on unevenness of a road surface while the two-wheeled vehicle is traveling, a load is applied to the shock absorber 10 such that the outer tube 12 and the inner tube 13 approach each other. At this time, the outer tube 12 and the inner tube 13 are displaced so as to approach each other against the urging force of the urging member 16. When the outer tube 12 is displaced with respect to the inner tube 13, the rod 14, the holding member 20, and the piston 15 are also displaced together with the outer tube 12. As the piston 15 is displaced, the oil Oi passes through the inside of the piston 15 to generate a damping force.

Figure 4:
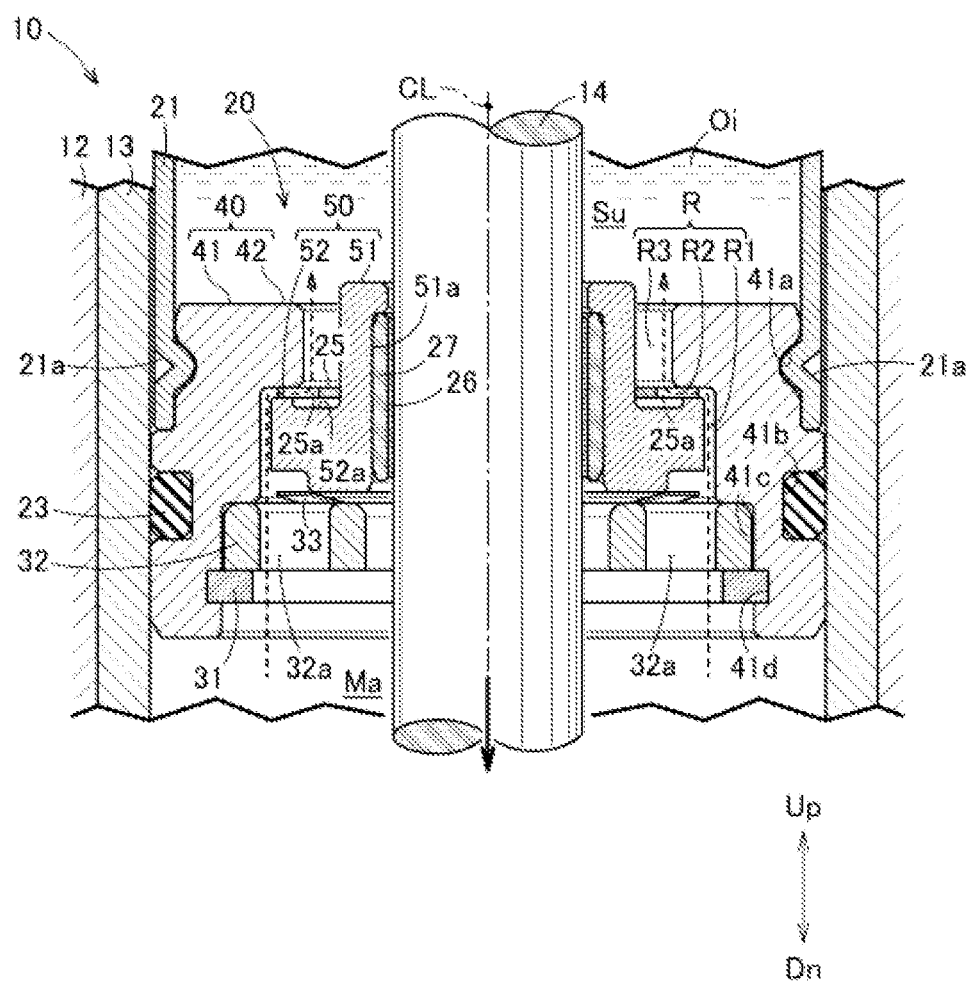
FIG. 4 is a view illustrating an operation of the shock absorber shown in FIG. 2.

Reference is made to FIG. 4. Due to the application of the load, the outer tube 12, the rod 14, and the holding member 20 are displaced downward with respect to the inner tube 13. As the rod 14 and the holding member 20 are displaced, the oil Oi corresponding to a volume of the rod 14 and the holding member 20 passes through the flow path R. At this time, the oil Oi flows in the order of the first flow path R1, the second flow path R2, and the third flow path R3, and flows from a main chamber Ma below the holding member 20 to a sub chamber Su above the holding member 20.

Reference is made to FIG. 1. Next, the outer tube 12 and the inner tube 13 are urged in directions away from each other by the urging force of the urging member 16. When the outer tube 12 is displaced with respect to the inner tube 13, the piston 15 is also displaced to generate a damping force.

Reference is made to FIG. 4. At this time, the outer tube 12, the rod 14, and the holding member 20 are displaced upward with respect to the inner tube 13. As the rod 14 and the holding member 20 are displaced, the oil Oi corresponding to a volume of the rod 14 and the holding member 20 passes through the flow path R. At this time, the oil Oi flows in the order of the third flow path R3, the second flow path R2, and the first flow path R1, and flows from the sub chamber Su into the main chamber Ma of the holding member 20.

The shock absorber 10 described above has the following effects.

The shock absorber 10 is formed with the flow path R through which the oil Oi can pass inside the holding member 20 that holds the rod 14. As a result, an oil pressure above and below the holding member 20 can be kept uniform, and smooth operation of the piston 15 (see FIG. 1) can be ensured. When the piston 15 operates smoothly, the damping force can be reliably generated.

In addition, the flow path R through which the oil Oi can pass is formed inside the holding member 20. This makes it possible to reduce the size of the shock absorber 10 in the radial direction.

As described above, it is possible to provide the shock absorber 10 capable of reliably generating a damping force even with a reduced size.

Further, the third flow path R3 is offset with respect to the first flow path R1 with reference to the radial direction of the rod 14. In other words, an axis of the third flow path R3 is shifted from an axis of the first flow path R1 in the radial direction of the rod 14. In maintenance of the shock absorber 10, the lid body 11 (see FIG. 1) may be removed. At this time, the oil Oi in the inner tube 13 may be ejected. The third flow path R3 and the first flow path R1 are offset in the radial direction, and the inside of the holding member 20 has a labyrinth structure, so that it is possible to prevent the ejection of oil Oi that may occur when the lid body 11 is removed.

The ring-shaped member 25 is formed with the recessed portions 25a recessed from the outer edge toward the rod 14 so as to connect the first flow path R1 to the third flow path R3. The second flow path R2 is formed by the recessed portion 25a. The second flow path R2 formed substantially perpendicular to the first flow path R1 and the third flow path R3 is formed by the recessed portion 25a of the ring-shaped member 25. As a result, the second flow path R2 can be easily formed inside the holding member 20, which is preferable.

The first flow path R1 is formed by the space between the first main body portion 41 and the second protruding portion 52. The first flow path R1 is formed by arranging the first member 40 and the second member 50, so that the first flow path R1 can be easily formed inside the holding member 20, which is preferable.

The third flow path R3 is formed by the space between the first protruding portion 42 and the second main body portion 51. The third flow path R3 is formed by arranging the first member 40 and the second member 50, so that the third flow path R3 can be easily formed inside the holding member 20, which is preferable.

The recessed portion 25a is formed in a slit shape. Since the ring-shaped member 25 can be easily processed, the processing cost of the ring-shaped member 25 can be reduced, which is preferable.

A plurality of the recessed portions 25a having the slit shape are formed. Depending on a dimensional error and play of each component, the rod 14, the second member 50, and the ring-shaped member 25 may be displaced in the radial direction with respect to the first member 40. At this time, an amount of overlap between any one of the recessed portions 25a and the first protruding portion 42 increases, which may make it difficult for the oil Oi to pass through. Since the plurality of recessed portions 25a are formed, the second flow path R2 is secured by another recessed portion 25a, and the oil Oi can be reliably passed through. In the present invention, the number of recessed portions 25a is not particularly limited. However, from the viewpoint of making it easy for the oil Oi to pass through, the number of the recessed portions 25a is preferably two or more, and more preferably three or more.

Next, a second embodiment of the present invention will be described with reference to the drawings.

Second Embodiment

Figure 5:
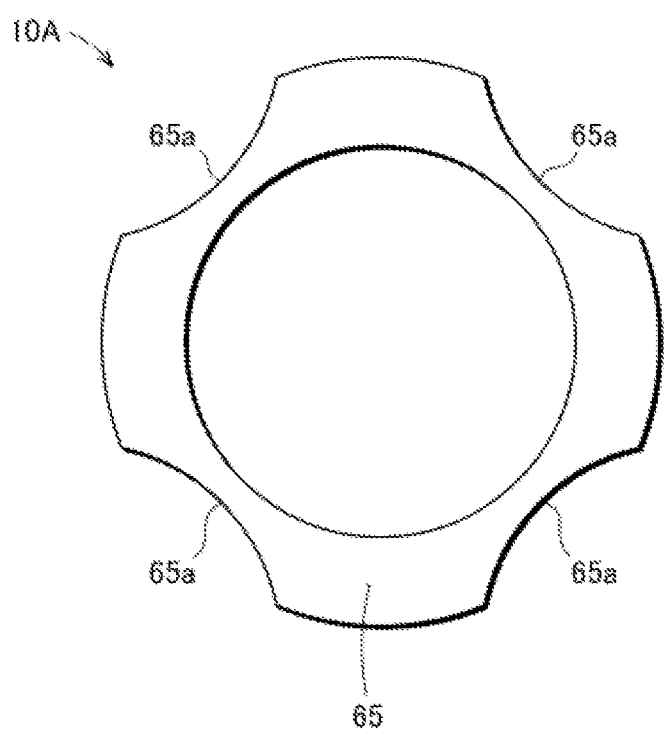
FIG. 5 is a plan view of a ring-shaped member used in a shock absorber according to a second embodiment.

FIG. 5 shows a ring-shaped member 65 used in a shock absorber 10A according to the second embodiment. In the shock absorber 10A according to the second embodiment, a substantially X-shaped ring-shaped member 65 is adopted instead of the ring-shaped member 25 used in the shock absorber 10 (see FIG. 2) according to the first embodiment. Other basic configurations are common to the shock absorber according to the first embodiment. For the parts common to the first embodiment, the reference numerals are used and detailed description thereof will be omitted.

The ring-shaped member 65 is formed with recessed portions 65a, which are notches having a substantially arc shape, at four locations at approximately 90° intervals. In the shock absorber 10A, the second flow path R2 (see FIG. 2) is also formed by the recessed portion 65a.

The shock absorber 10A described above also achieves the predetermined effect of the present invention.

Next, a third embodiment of the present invention will be described with reference to the drawings.

Third Embodiment

Figure 6:
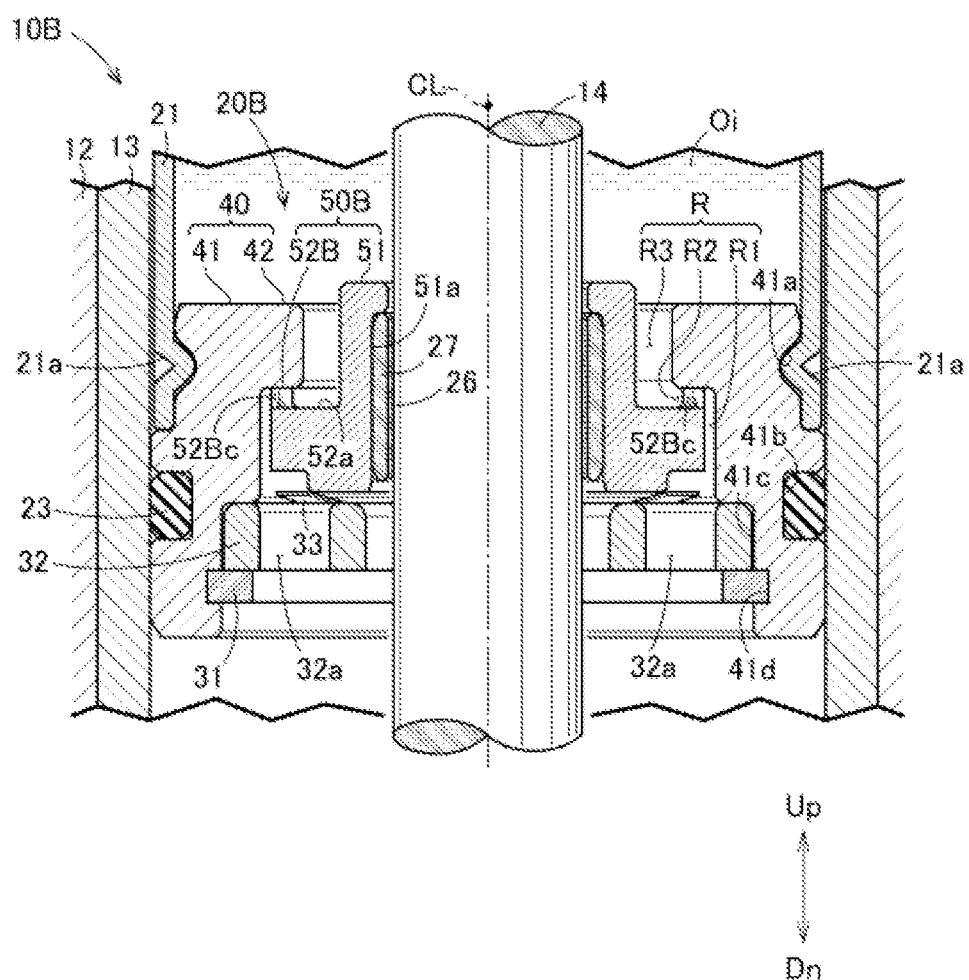
FIG. 6 is an enlarged view showing a main part of a shock absorber according to a third embodiment.

FIG. 6 shows a cross-sectional configuration of a shock absorber 10B according to the third embodiment, and corresponds to FIG. 2. In the shock absorber 10B according to the third embodiment, instead of the ring-shaped member 25 (see FIG. 3) used in the shock absorber 10 (see FIG. 2) according to the first embodiment, the second flow path R2 is formed by a portion of a second member 50B. Other basic configurations are common to the shock absorber according to the first embodiment. For the parts common to the first embodiment, the reference numerals are used and detailed description thereof will be omitted.

Figure 7:
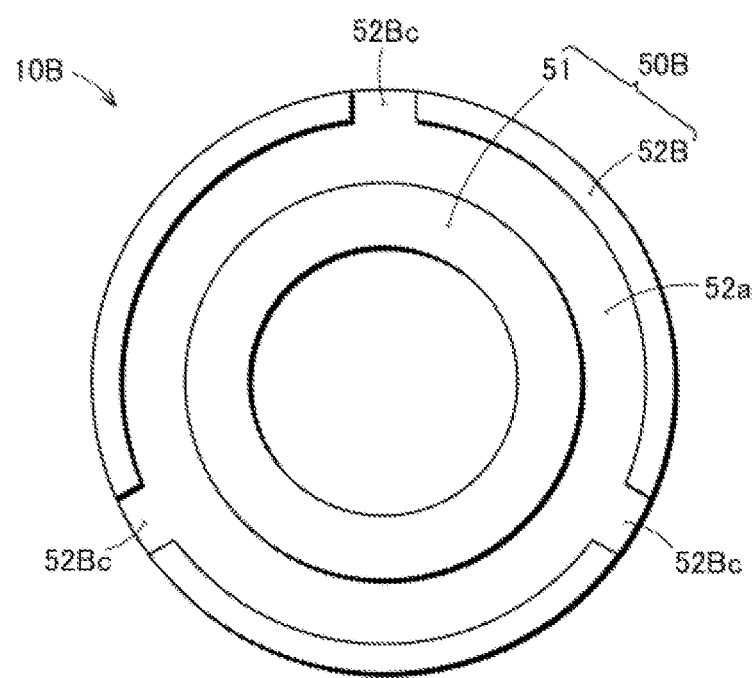
FIG. 7 is a plan view of a second member shown in FIG. 6.

Reference is also made to FIG. 7. The second flow path R2 is formed by a groove portion 52Bc having a recessed shape from an outer edge of a second protruding portion 52B toward the rod 14. Each of the groove portions 52Bc is connected to the annular groove 52a. A bottom surface of the groove portion 52Bc and a bottom surface of the annular groove 52a are so-called surfaces.

The shock absorber 10B described above also achieves the predetermined effect of the present invention.

Further, the second flow path R2 is formed by the groove portion 52Bc having a recessed shape from the outer edge of the second protruding portion 52B toward the rod 14. Since the ring-shaped member 25 (see FIG. 2) is not used, the shock absorber 10B can be configured with a small number of components.

In addition, a plurality of groove portions 52Bc are formed, each of these groove portions 52Bc is connected to the second protruding portion 52B by an annular groove 52a formed in an annular shape, and at least a part of the annular groove 52a faces the third flow path R3. Even when the rod 14 and the first member 51 are displaced in the radial direction, the oil Oi can flow more smoothly.

Although the shock absorber according to the present invention has been described by taking an inverted front fork as an example, the shock absorber can also be applied to an upright front fork or a rear damper device. Further, the rod 14 may be supported by the inner tube 13. In this case, the support tube 21 may be supported by the inner tube 13, or the support tube 21 may not be used.

Furthermore, the shock absorber according to the present invention is not limited to the one in the form of the present invention. That is, the present invention is not limited to the embodiments as long as the functions and effects of the present invention are exhibited.

The shock absorber according to the present invention is suitable for a front fork of a two-wheeled vehicle.

The invention claimed is:
1. A shock absorber comprising:
an outer tube having a tubular shape;
a tubular inner tube provided inside the outer tube, provided to be movable relative to the outer tube, and filled with oil therein;
a rod-shaped rod provided inside the inner tube, supported by the outer tube or the inner tube, and extending along an axial direction of the inner tube;
a piston fixed to the rod and configured to generate a damping force when the inner tube moves relative to the outer tube;
an urging member configured to urge the outer tube and the inner tube in directions away from each other;
a holding member provided on an outer periphery of the rod, whose inner periphery is in contact with the rod so as to hold the rod; and
a flow path formed inside the holding member and through which the oil passes, the flow path including a first flow path extending along the rod from one end of the holding member in the axial direction, a second flow path extending from an end portion of the first flow path along a radial direction of the rod, and a third flow path extending along the rod from an end portion of the second flow path to the other end of the holding member in the axial direction,
wherein an annular ring-shaped member is disposed between the first flow path and the third flow path,
wherein the ring-shaped member is provided with a recessed portion recessed from an outer edge toward the rod so as to connect the first flow path to the third flow path,
wherein the second flow path is formed by the recessed portion,
wherein the holding member includes;
a first member having a tubular first main body portion provided on an inner side of the inner tube and extending in the axial direction of the inner tube, and
a second member having a tubular second main body portion provided on an inner side of the first member and an outer side of the rod and extending in the axial direction of the inner tube, and a second protruding portion protruding from the second main body portion toward the first main body portion,
wherein the first flow path includes a space formed between the first main body portion and the second protruding portion,
wherein the first member has a first protruding portion protruding from the first main body portion toward the second main body portion, and
wherein the third flow path includes a space formed between the first protruding portion and the second main body portion.
2. The shock absorber according to claim 1,
wherein the recessed portion is a slit provided in the plate ring-shaped member.
3. The shock absorber according to claim 2,
wherein the recessed portion includes a plurality of recessed portions having a slit shape.
4. The shock absorber according to claim 1,
wherein an annular groove is formed on an upper surface of the second protruding portion.
5. A shock absorber comprising:
a tubular outer tube disposed at an upper part;
a tubular inner tube extending downward from inside of the outer tube, provided to be movable relative to the outer tube, and filled with oil therein;
a rod provided inside the inner tube and supported by the outer tube or the inner tube;
a piston fixed to the rod and configured to generate a damping force when the inner tube moves relative to the outer tube;
an urging member configured to urge the outer tube and the inner tube in directions away from each other; and a holding member provided on an outer periphery of the rod, whose inner periphery is in contact with the rod so as to hold the rod, wherein the holding member includes:
- a first member having a tubular first main body portion provided along an inner periphery of the inner tube and a first protruding portion protruding from the first main body portion toward an axis of the rod;
- a second member having a tubular second main body portion provided on an inner side of the first member and an outer side of the rod, and a second protruding portion provided below the first protruding portion and protruding from the second main body portion toward the first main body portion, the second protruding portion being urged toward the first protruding portion;
- a ring-shaped member, which is an annular member sandwiched by the first protruding portion and the second protruding portion, having a plurality of recessed portions that are recessed from an outer edge further to the rod side than a tip end of the first protruding portion; and
- a flow path including
  - a first flow path which is a space between the first main body portion and the second protruding portion and through which the oil passes,
  - a second flow path which is a space defined by the recessed portions and through which the oil passes, and
  - a third flow path which is a space between the first protruding portion and the second main body portion and through which the oil passes.

6. The shock absorber according to claim 5,
wherein an annular groove is formed on an upper surface of the second protruding portion.

* * * * *